Feb. 10, 1942.  E. W. ALLARDT  2,272,179
MECHANISM FOR CUTTING BODIES INTO SECTIONS
Filed Aug. 31, 1940   8 Sheets-Sheet 4

INVENTOR
ERNST W. ALLARDT
BY Geo. B. Pitts
ATTORNEY

Feb. 10, 1942. E. W. ALLARDT 2,272,179
MECHANISM FOR CUTTING BODIES INTO SECTIONS
Filed Aug. 31, 1940 8 Sheets-Sheet 6

INVENTOR
ERNST W. ALLARDT
BY Geo. B Pitts
ATTORNEY

Feb. 10, 1942. E. W. ALLARDT 2,272,179
MECHANISM FOR CUTTING BODIES INTO SECTIONS
Filed Aug. 31, 1940 8 Sheets-Sheet 8

INVENTOR
ERNST W. ALLARDT
BY
ATTORNEY

Patented Feb. 10, 1942

2,272,179

UNITED STATES PATENT OFFICE 2,272,179

MECHANISM FOR CUTTING BODIES INTO SECTIONS

Ernst W. Allardt, Parma, Ohio, assignor to The Yoder Company, Cleveland, Ohio, a corporation of Ohio Application August 31, 1940, Serial No. 354,917

27 Claims. (Cl. 164—61)

This invention relates to mechanism for cutting hollow bodies into sections, more particularly a mechanism which may operate automatically and effect a cutting of each body at spaced points simultaneously. While I have shown and described a mechanism which automatically operates to successively deliver the bodies to cutting position, cut the bodies into sections and discharge the latter from cutting position in co-ordinated relation, it will be understood that the invention in its broader aspects is not to be limited to such a construction, since these operations or certain thereof may be effected manually; also, for the purpose of illustrating one application of the invention, the present embodiment is applied to the simultaneous cutting of tubular bodies or pipes into sections, but the invention is not to be limited to bodies of this cross sectional shape.

One object of the invention is to provide an improved mechanism for successively feeding bodies into cutting position and simultaneously cutting each body into two or more sections.

Another object of the invention is to provide an improved mechanism of this type wherein the successive feeding of the bodies and cutting of each section are automatically controlled.

A further object of the invention is to provide an improved mechanism of this type that is relatively simple and wherein the successive feeding of the bodies and cutting thereof are effected in a rapid manner.

Other objects of the invention will be apparent to those skilled in the art to which my invention relates from the following description taken in connection with the accompanying drawings, wherein—

In the drawings, 1 indicates as an entirety a frame comprising a base 1a and side members 1b, connected by a wall 1c, a rear wall 1d and top walls 1e. 1f indicates a lower cross member secured to the walls 1c and 1b and 1g indicates an upper cross member extending between and suitably connected at its opposite ends to the side members 1b. The spacing of the side members 1b depends upon the maximum length of the bodies A to be cut into sections. The preferred embodiment of the invention, as herein disclosed, is constructed and arranged to operate on hollow bodies such as pipes, being adapted to receive pipes that are approximately fifteen feet long and to cut the same into two or more sections. In mechanism heretofore built by me, I have provided it with seven cutters arranged to cut each pipe into eight sections.

2 indicates a pair of tubular members suitably supported at their opposite ends on the side members 1b and arranged to support a runway or chute 3 to which pipes A are delivered, the runway 3 being inclined downwardly whereby the pipes may gravitate to successively engage removable stops 4. The runway 3 is preferably secured to the members 2 by U-bolts 2a disposed adjacent the opposite sides of the runway. The runway 3 may be of any desired length to accommodate a large number of pipes A. The runway 3 is provided along its opposite sides with side walls 3a arranged to be engaged by the opposite ends of the pipes to prevent their disalinement and to insure their delivery in proper relation to the cutter or cutters. Suitable means (not shown) are provided for adjusting each side wall 3a toward and from the other side wall, dependent upon the length of the pipes to be cut into sections.

Parts of the mechanism are enclosed by a housing 5 which is suitably secured to the top wall 1e, the rear portion of the housing being secured by bolts 5a to a strip 5a' extending between and supported by the side members 1b. 5b indicates a plate secured to the strip 5a' by the bolts 5a (Figs. 1a and 2) and extending downwardly and inwardly therefrom toward the front of the frame 1 in spaced parallel relation to the runway 3 to prevent upward displacement of the pipes A as they roll down the runway, the free end portion of the plate 5b adjacent its opposite ends being provided with lugs 6 (one only being shown in Figs. 2 and 2a), which are secured to portions of the side walls 1b by pins 6a projecting inwardly therefrom, the lugs 6 being held on the pins 6a by the bolts 5a.

7, 7a, indicate as entireties a plurality of supports on which each pipe A rests while being cut into sections a. The supports 7, 7a, are adjustably mounted on the lower cross member 1f, the supports 7 being arranged to support the opposite end portions of each pipe A and the supports 7a being arranged to support their intermediate portions perferably below each cutter 8 so as to resist the pressure on the pipe incident to the engagement of the adjacent cutters therewith. Each support 7, 7a, consists of a casting 7x having a rear wall 7b secured to the cross member 1f and a top wall 7c provided at its ends with up-standing side walls 7d (see Figs. 8, 9 and 10). The side walls 7d support the opposite ends of a pair of spaced shafts 9, on which freely rotate rollers 10, adapted to receive each pipe A as it is discharged from the runway 3 (see Fig. 2). Each roller is in axial alinement with and its periphery lies in the same plane as the corresponding rollers of all of the remaining pairs of rollers, this arrangement being important where, as later set forth, devices 7' are provided in the path of movement of each pipe into cutting position on the supports 7, 7a, for controlling the operation of the cutting or severing means. As shown, the devices 7' are arranged in the path of movement of the opposite end portions of each pipe A, and both devices are required to be operated by each pipe to prevent operation of the support or member 19 for the cutters and engagement of the latter with the pipe prior to the positioning of the pipe throughout its length on the supports 7, 7a. The rollers 10 not only support each pipe A in a predetermined position but permit it to be rotated by the cutters 8, so that the latter will engage with and cut the pipe wall circumferentially to effect a severence thereof into sections.

Figure 9:
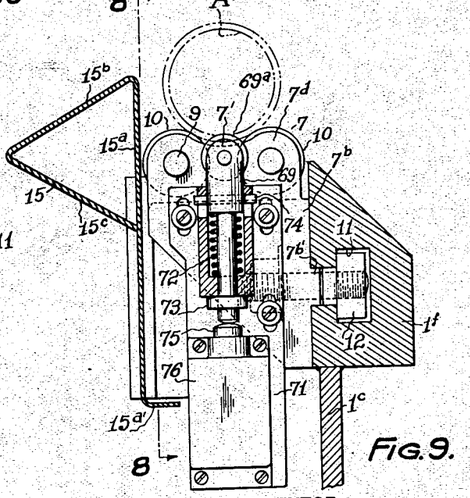
Fig. 9 is a section on the line 9—9 of Fig. 8.
Figure 10:
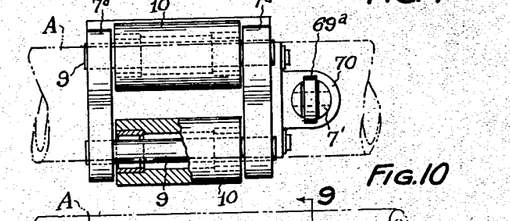
Fig. 10 is a top plan view of the parts shown in Fig. 8.

Each of the castings 7x may be adjustably secured to the cross member 1f in any desired manner, but I prefer to form in the cross member 1f a T-shaped slot 11, which extends from end to end thereof, and to provide therein a headed bolt 12 the shank of which extends through an opening formed in the rear wall 7b of the casting 7x so that a nut 12a threaded on the outer end thereof serves to adjustably secure the casting in fixed relation to the cross member 1f. As shown in Fig. 9, the rear wall 7b of the casting 7x is provided with a rib 7b' which slidably fits into the opening 11, and through the engagement of the rib with the walls of the opening, the casting 7x is maintained in upright position while permitting it to be adjusted longitudinally of the cross member 1f.

13 indicates casings mounted on the cross member 1f, adjacent the side members 1b, each casing being provided with a plate 13a which cooperates with the adjacent wall of the casing to form a guide 14 to slidably support the adjacent end of a reciprocatable guard, indicated as an entirety at 15, extending in front of the supports 7, 7a. The opposite ends of the guard 15 are provided with shoes 16 (see Figs. 11 and 12) which slide in the guides 14. The guard 15 is formed of sheet metal and consists of a vertical wall 15a the upper portion of which is normally disposed above and in front of the rolls 10 to prevent each pipe A, when released by the stops 4, from rolling past the rollers 10 and a wall 15b extending from the upper end of the wall 15a downwardly and outwardly to form a discharge guide for the pipe sections a (see Fig. 2a) upon operation of the guard downwardly, as later set forth. The wall 15b is extended and disposed downwardly and inwardly as shown at 15c for engagement with the vertical wall 15a, so as to brace the wall 15b. The lower end of the vertical wall 15a is provided with a foot or flange 15a', which adjacent its opposite ends is suitably secured to a pair of lugs 17, each pivotally connected to a link 17a. The links 17a are pivotally connected to corresponding arms 18 of bell cranks 18a to be later referred to.

19 indicates as an entirety a member guided for reciprocating movement vertically and carrying the cutters 8, which, upon the downward movement of the member, engage each pipe A and cut it into sections a. Each end of the member 19 is provided with a shoe 19a which slidably engages gibs 20, 20a, positioned on the front side a wall 1b' secured to the adjacent side wall 1b, and a bar 21 secured by screws 21a to the wall 1b, (see Figs. 3 and 5). The gib 20a is adjusted inwardly by a screw 20a'. Inwardly of each shoe 19a, the member 19 is formed with a recess in which is mounted a boss 22, the sides of which are welded to the marginal walls of the recess, the boss 22 being formed with a threaded opening 22a to receive the lower threaded end of a rod 23, which is locked in position by a nut 23a. The rods 23 extend upwardly through openings 1e' formed in the top wall 1e and carry at their upper ends pistons 24 each mounted in a cylinder 24a, so that by supplying a fluid (such as oil) under pressure to the cylinders 24a below the pistons 24 therein the member 19 is raised and by supplying fluid under pressure to the cylinders 24a above the pistons 24 the member 19 is lowered, this latter movement serving to effect the engagement of the cutters 8 with the pipe A. The cutters 8 are of the rotary type, each consisting of a disk provided on its periphery with a cutting edge and power driven, preferably by a driven shaft 25 common to all of the cutters, whereby the cutters 8 serve to rotate the pipe on the rollers 10 and each thereof to cut through the pipe wall throughout its circumference. The shaft 25 is mounted in suitable bearings 25a provided on the reciprocating member 19, one end of the shaft being extended beyond the member 19 and provided with a power driven element 25b. The power driven element 25b preferably consists of a pulley having V-grooves in its periphery for engagement by belts 26, which are correspondingly shaped in cross section and engage a pulley 27 having V-grooves, fixed to the shaft of a motor 27a. The motor 27a is mounted so that the axis of its shaft lies in a plane extending substantially midway between the limits of reciprocating movement of the member 19. This arrangement provides for a direct drive from the motor shaft to the shaft 25, while permitting the latter to move upwardly and downwardly with the member 19.

It will be understood that the travel of the member 19 is limited by the engagement of the pistons 24 with the end walls of the cylinders 24a, the rods 23 being adjusted in the openings 22a to support the cutters 8 at a predetermined distance from the pistons 24, so that the cutters in approaching their limit of downward movement will first cut through the upper portion of the pipe wall and simultaneously effect rotation of the pipe to continue the cutting throughout the circumference of the pipe. By rotating the rods 23, the distance of the cutters from the pistons may be increased or decreased to regulate the engagement of the cutters with the pipe wall.

Figure 6:
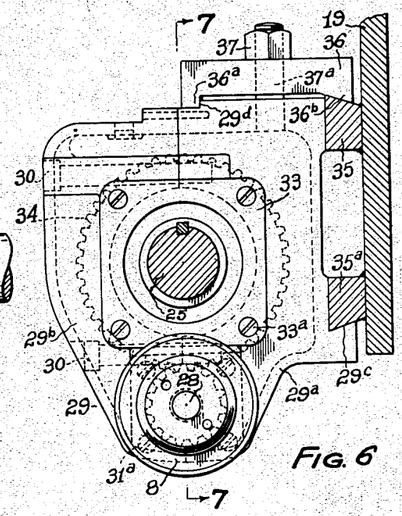
Fig. 6 is a section on the line 6—6 of Fig. 1.
Figure 7:
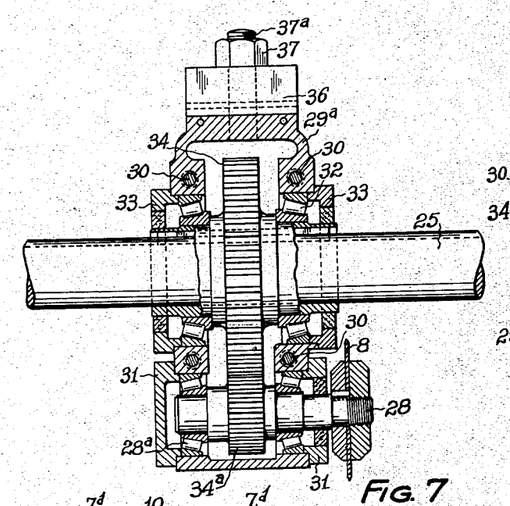
Fig. 7 is a section on the line 7—7 of Fig. 6.
Figure 7A:
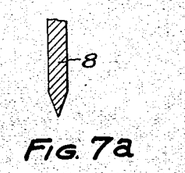
Fig. 7a is a fragmentary section of a cutter on the line 7—7 of Fig. 6, enlarged.

Each cutter 8 is suitably fixed to one end of a shaft 28, rotatable in tapered roller bearings 28a, which are mounted in a housing 29 (see Figs. 6 and 7). Each housing consists of inner and outer sections 29a, 29b, secured together by bolts 30. The opposed side walls of the sections 29a, 29b, adjacent their lower ends are recessed to accommodate the bearings 28a and to receive caps 31, which are secured to the sides of the sections by screws 31a and which engage the outer races of the bearings to hold the latter in assembled relation against shoulders provided on the shaft 28, as shown in Fig. 7. The opposed side walls of the housing sections 29a, 29b, above the shaft 28, and in line with the shaft 25, are recessed to accommodate tapered roller bearings 32, in which the shaft 25 is mounted and to receive caps 33, which are secured to the sides of the sections by screws 33a and which engage the outer races of the bearings 32 to hold the latter in assembled relation against the opposite ends of the hub of a gear 34, the latter being splined to the shaft 25 for adjustment therealong with the adjacent housing 29, as later set forth. The gear 34 meshes with a pinion 34a preferably formed integrally with the shaft 28 to drive the latter. The housing sections of each housing 29 are secured together in a liquid tight manner, so as to hold a suitable lubricant for the gear and pinion and bearings. Each of the housings 29 is adjustable longitudinally of the member 19 to position the adjacent cutter in a predetermined relation to the adjoining cutter or cutters 8, whereby each pipe A is cut into sections of the desired length, such adjustment providing for the cutting of each pipe into sections of uniform or non-uniform lengths. To permit of this adjustment, the member 19 is provided with longitudinally extending undercut upper and lower guides 35, 35a, and the housing section 29a, on its inner side, is formed with a recess 29c, the lower portion of which is complementary to the guide 35a, and removably fixed thereto by a clamp 36. The clamp 36 is provided with flanges 36a, 36b, which are respectively in engagement with and secured to a shoulder 29d on the housing section 29a and the guide 35 by a nut 37 threaded on a pin 37a, which projects upwardly from the housing section 29a and through the clamp 36, against the latter.

It is important to insure bodily movement of the member 19 upwardly and downwardly; that is, during movement of the member 19 to prevent either end thereof from moving slower or faster than its opposite end. For this purpose I provide between the member 19 and frame 1 an equalizing means, preferably consisting of the following: 38 indicates a shaft rotatable at its opposite ends in suitable bearings 38a mounted on the rear side of the walls 1b' (see Fig. 5). 39 indicates a gear fixed to the shaft 38 adjacent each end thereof and in mesh with a vertically extending rack 39a suitably fixed to the inner face of the member 19. In operation, as the member 19 moves up and down, the racks 39a will rotate the gears 39, and as the gears are fixed to the shaft 38, each gear and the adjacent rack will co-act with the other gear and adjacent rack to prevent any tendency of one end of the member 19 to move faster or slower than its opposite end, and thus insure simultaneous engagement of all of the cutters 8 with each pipe A as well as the accurate operation of the control switches hereinafter referred to.

Figures 2, 11, 12:
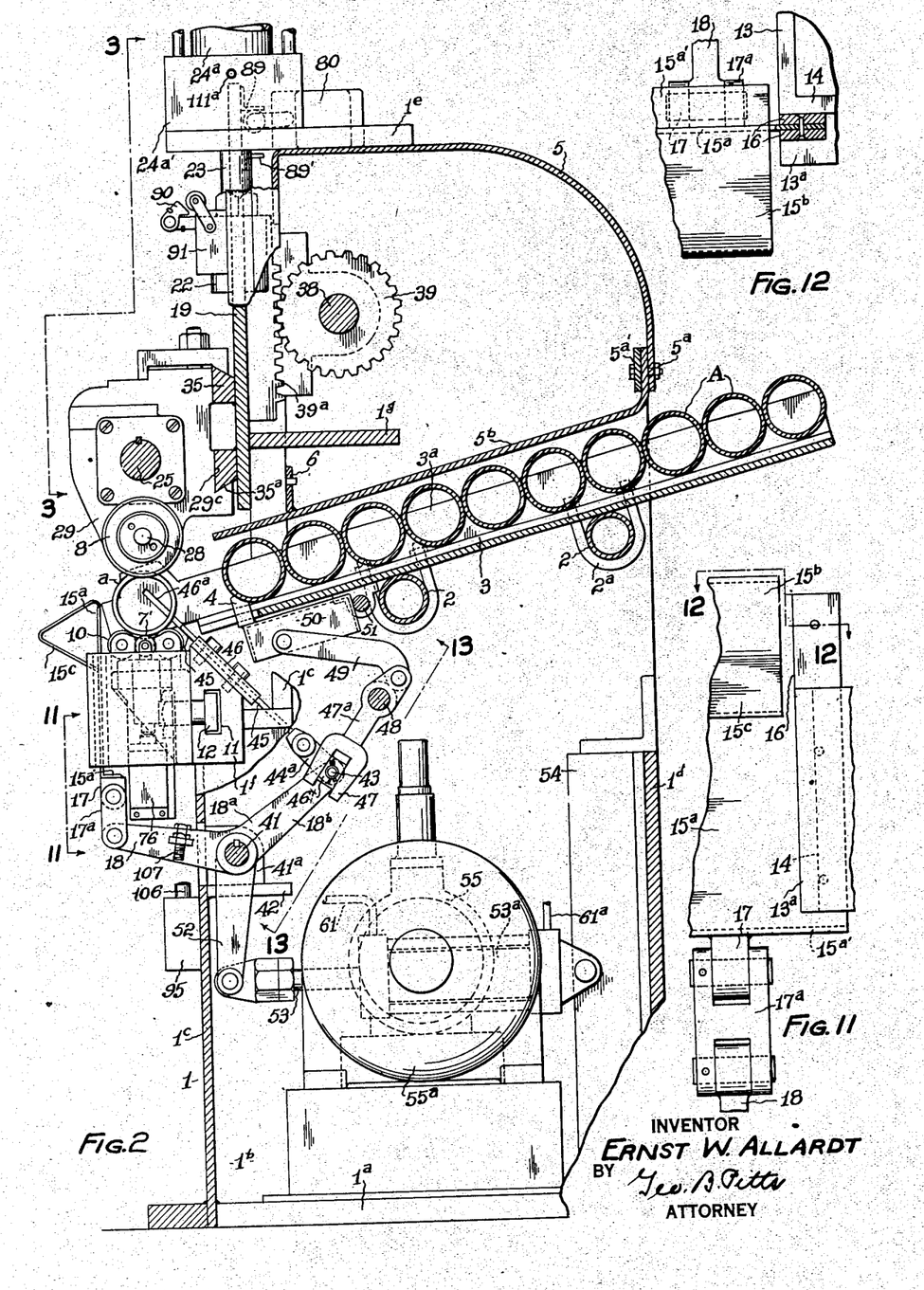
Fig. 2 is a fragmentary section on the line 2—2 of Fig. 1.
Fig. 11 is a fragmentary view of the line 11—11 of Fig. 2.
Fig. 12 is a section on the line 12—12 of Fig. 11.
Figure 2A:
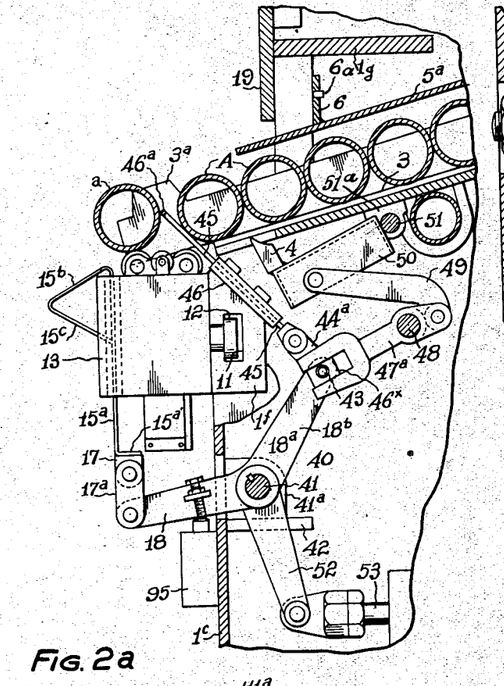
Fig. 2a is a fragmentary view of parts shown in Fig. 2, but showing such parts in a different position.
Figure 13:
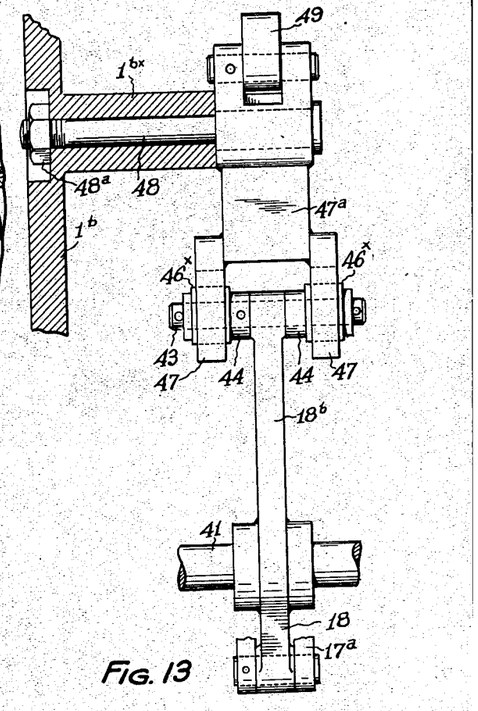
Fig. 13 is a fragmentary view of the line 13—13 of Fig. 2.

Means, indicated as an entirety at 40, are provided for operating in co-ordinated relation the guard 15, an ejector to discharge the pipe sections a from the supports 7, 7a, and the stops 4 to release the succeeding pipe A from the runway 3 for delivery to the supports 7, 7a, following each cutting operation and during movement of the member 19 upwardly. Of the means 40, 41 indicates a rock shaft rotatable in suitable bearings 41a, which are mounted on a support 42 adjacent to, but within the side walls 1b, and having fixed thereto the bell-cranks 18a. The arm 18b of each bell-crank 18a is provided at its outer end with a shaft or pin 43, which extends through knuckles 44 on the inner end of a link 44a and straddling the arm 18b (see Fig. 13). The outer end of the link 44a is pivotally connected to the inner end of an ejector 45 extending longitudinally of the frame 1 rearwardly of the supports 7, 7a, and slidably supported at its opposite ends in guides 46, 46a, disposed in a plane extending substantially radially of each pipe A when positioned on the supports 7, 7a. The guides 46 are mounted on the opposite end portions of the cross member 1f, whereas the guides 46a consist of slots formed in the front end portions of the side walls 3a. As shown in Fig. 2, when the ejector 45 is in its normal position, its outer end is below the plane of the runway 3, but upon the rocking of the shaft 41, the arms 18b of the bell-cranks 18a move the ejector 45 outwardly, as shown in Fig. 2a, whereby its front end engages the pipe sections a and discharges them from the supports 7, 7a. As the guard 15 is connected to the other arms 18 of the bell-cranks 18a, it is moved downwardly simultaneously with the outward sliding movement of the ejector 45, to permit the ejection or discharge of the pipe sections a, the wall 15b of the guard serving to guide the sections into a suitable receiver (not shown). The outer opposite ends of the pin 43 pivotally mount blocks 46x, which slidably fit between the spaced bifurcations 47 on the outer end of a link 47a fulcrumed on a shaft 48. By preference, I provide separate shafts 48 for the links 47a, each mounted on the adjacent side wall 1b in axial alinement with the other shaft 48. Each shaft 48 may consist of a headed bolt extending through a hollow boss 1b$^x$ formed integrally on the inner face of the adjacent side wall 1b, the link 47a being pivoted on the bolt between its head and the outer end of the boss 1b$^x$ (see Fig. 13). The bolt 48 is held in position by a nut 48a threaded on its outer end in engagement with the outer face of the adjacent side wall or a countersunk recess formed therein (see Fig. 13). The opposite end of each link 47a is pivotally connected to one end of a separate link 49, the opposite end of which is pivotally connected to the end wall of a swingable member 50. The inner wall of the member 50 is provided at its opposite ends with laterally projecting stud shafts 51, which are suitably mounted in bearings 51a, provided on and depending from the lower side of the runway 3, to permit swinging movement of the member 50. The front end of the member 50 is provided with a plurality of upwardly extending spaced lugs which form the stops 4, hereinbefore referred to. The front end portion of the runway 3 is slotted to accommodate the stops 4. As the member 50 is connected through the links 49 and 47a to the bell-cranks 18a, the stops 4 thereon are operated downwardly, to release the forward-most pipe A from the runway 3, simultaneously with the movement of the ejector 45 outwardly (see Fig. 2a), and as the ejector when in its operated position is disposed between the delivery end of the runway 3 and the supports 7, 7a, it forms a stop for the released pipe and prevents the latter from gravitating onto the supports 7, 7a, until it moves back to its normal position. In the arrangement shown, the ejector 45, when in operated position (see Fig. 2a), is spaced from the stops 4 a distance substantially equal to the diameter of the pipes A, so that when it stops the released pipe A it also operates to prevent the remaining pipes A on the runway from gravitating a distance greater than the diameter of one pipe. Accordingly, the succeeding pipe is stopped in position to be engaged by the stops 4, so that upon the return of the ejector 45 to its normal position, and movement outwardly of the stops 4 the latter engage with the succeeding pipe A to hold it and the remaining pipes on the runway 3. It will thus be seen that the ejector 45 and stops 4 co-operate to release the pipes A one by one in each complete operation thereof.

The rock shaft 41 is operated in opposite directions by the following: 52 indicates an arm suitably fixed at one end to the rock shaft 41, preferably substantially midway between the bell-cranks 18a. The other end of the arm is pivotally connected to the outer end of a rod 53, which carries at its inner end a piston slidable in a cylinder 53a, the rear end or head of the latter being pivotally mounted on a wall 54 forming part of the frame 1. By the supply of a fluid, under pressure, to the cylinder 53a, at either side of the piston therein, the latter will operate through the rod 53 and arm 52 to rock the shaft 41. The supply of fluid to each side of the piston in the cylinder 53a is co-ordinated with the supply of fluid to one side of the pistons in the cylinders 24a, as later set forth.

The fluid supply consists of a suitable pump 55 of the rotary type, driven by a motor 55a, the intake of the pump 55 being connected by a pipe 56 with a suitable reservoir 56a, into which the fluid return pipe 57 leads.

Figure 1:
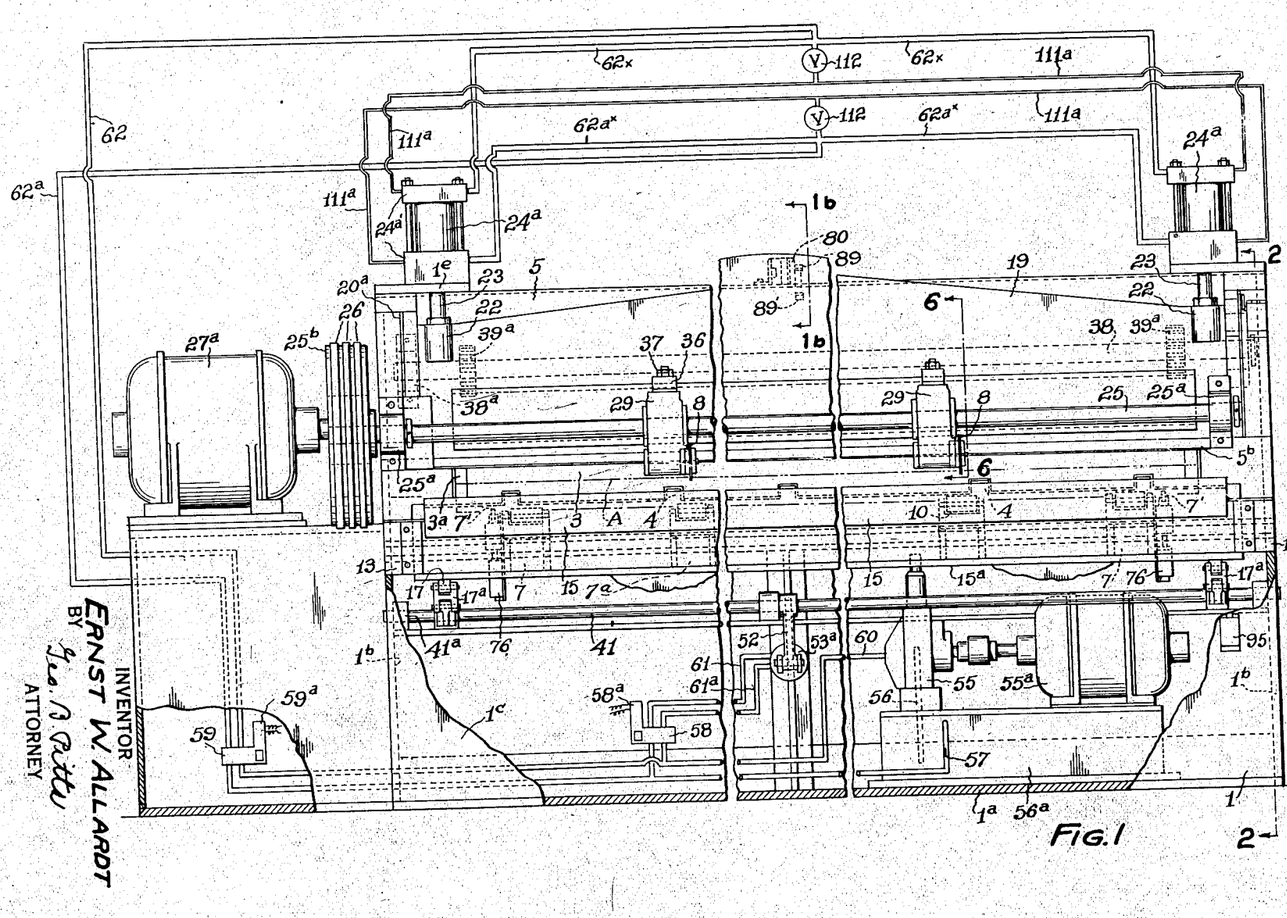
Fig. 1 is a front elevation of a mechanism embodying my invention, parts thereof being shown diagrammatically.
Figures 1A, 1B, 15, 16:
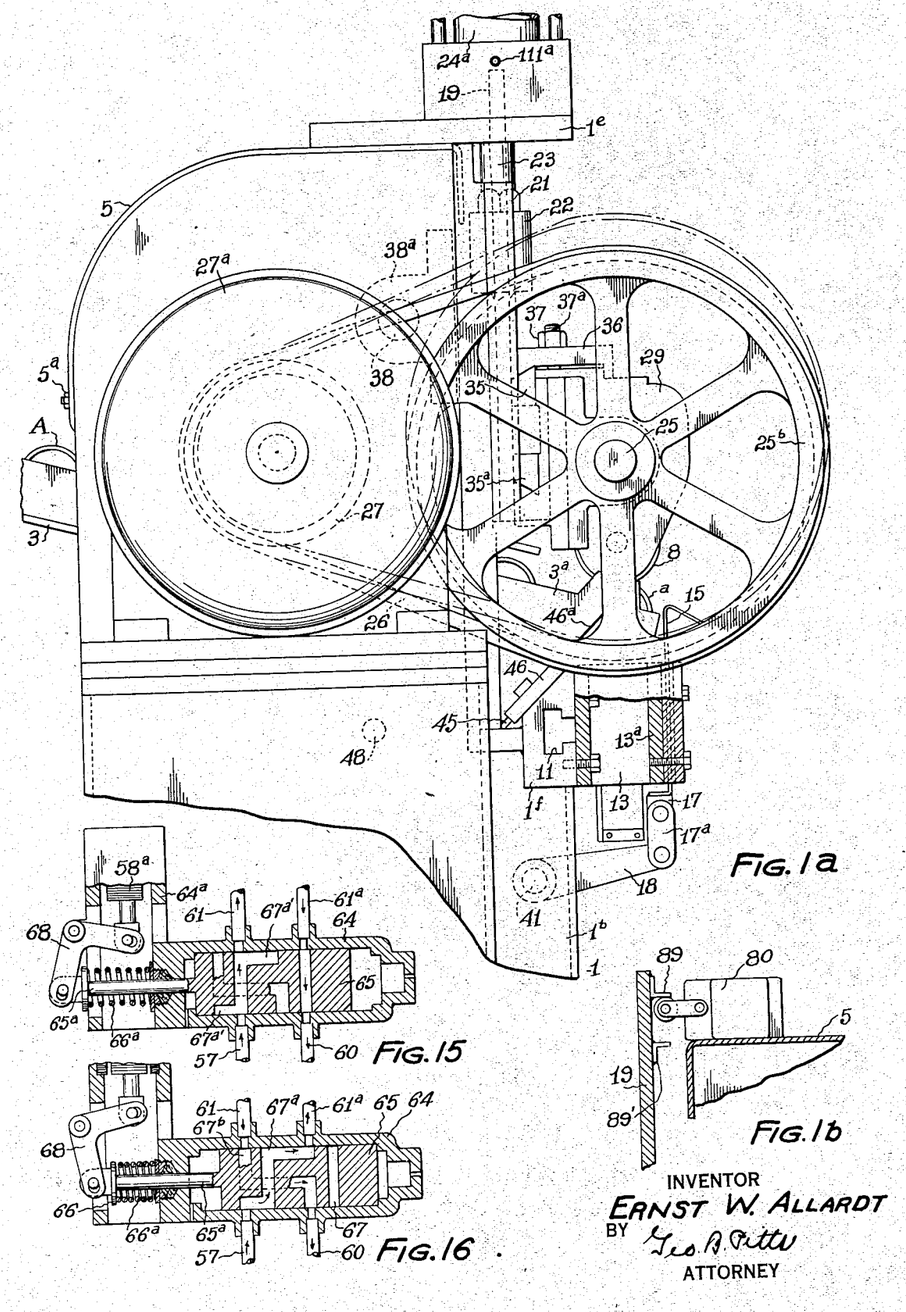
Fig. 1a is a side elevation.
Fig. 1b is a fragmentary section on the line 1b—1b of Fig. 1.
Fig. 15 is a fragmentary section of one of the valves and the solenoid for operating the valve.
Fig. 16 is a view similar to Fig. 15, but showing the valve element of the valve in a different position.

The supply of fluid from the pump 55 to either side of the piston in the cylinder 53a is controlled by a four-way valve 58, the valve element of which is spring operated in one direction and operated in the opposite direction by a solenoid 58a in opposition to the spring, as later set forth; whereas the supply of fluid to either side of the pistons in the cylinders 24a is controlled by a four-way valve 59, the valve element of which is operated in one direction by a spring and in the opposite direction by a solenoid 59a in opposition to the spring, as later set forth. As shown in Fig. 1, the discharge pipe 60 from the pump is connected to the valves 58, 59, and each valve is connected by the return pipe 57 to the reservoir 56a. The valve 58 is connected by pipes 61, 61a, to the opposite ends of the cylinder 53a and the valve 59 is connected by a pipe 62 and branches 62x to the upper ends of the cylinders 24a and by a pipe 62a and branches 62a$^x$ to the lower ends of the cylinders 24a. In this arrangement, in one position of the valve element of the valve 58, the fluid flows through pipe 60 and one of the pipes 61, 61a, to one side of the piston in the cylinder 53a, and the fluid in the cylinder on the other side of the piston flows through the other pipe to and through the return pipe 57 and in the other position of the valve element the flow through the pipes 61, 61a, is reversed. The flow of the fluid through the pipes 62, 62a, is similarly controlled by the valve element of the valve 59. As the valves 58 and 59, are similar in construction and operation, only one thereof (namely, valve 58) needs be described as follows in reference to Figs. 15 and 16: 64 indicates a casing having a lateral extension 64a for supporting the solenoid 58a. 65 indicates the valve element slidable in the casing and having at one end a shank 65a which extends through the adjacent end wall and is provided on its outer end portion with a collar 66, so that a coiled spring 66a interposed between the collar and the said end wall, serves normally to bias the valve element in one direction to normal position, as shown in Fig. 15. The valve element 65 is formed with three ducts 67, 67a, 67b, and when in normal position the duct 67 connects the supply pipe 60 to the pipe 61a and the duct 67a connects the pipe 61 to the return pipe 57. In the other position of the valve element, the duct 67b connects the pipe 60 to the pipe 61 and the duct 67a through its lateral extensions 67a' connects the pipe 61a to the pipe 57, as shown in Fig. 16. The core of the solenoid 58a is connected by a bell-crank 68 to the outer end of the shank 65a, so that when the coil of the solenoid is energized, it slides the valve element to its other position and when the solenoid coil is de-energized the spring 66a returns the valve element to its normal position. The end walls of the casing serve to limit the movement of the valve element 65a in either direction to insure registry of the ports of the ducts with the pipes 60, 61, 61a and 57.

Figure 8:
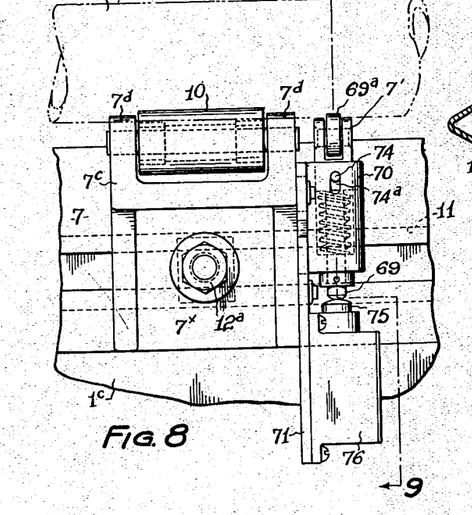
Fig. 8 is a fragmentary view of the line 8—8 of Fig. 9.

Each of the devices 7' consists of a plunger 69 endwise slidably mounted in openings formed in the end walls of a hollow casing 70 which is formed integrally with a plate 71, the plate being adjustably mounted on the outer side of the adjacent support 7a (see Figs. 8 and 9). The upper end of the plunger 69 is bifurcated and supports a shaft on which and between the bifurcations freely rotates a roller 69a arranged to be engaged by each pipe A as it gravitates onto the supports 7, 7a. As will be understood from Figs. 9 and 10, the plungers 69 are arranged in a plane intermediate the spaced rows of rollers 10 on the supporting casting 7x, so that the lower portion of each pipe will engage the rollers 69a and depress the plungers 69 as the pipe gravitates onto to the rollers 10. A portion of each plunger 69 within the adjacent casing 70 is reduced to form a shoulder and accommodate a coiled spring 72 interposed between the shoulder and the remote end wall of the casing 70. The spring serves normally to bias the plunger upwardly to a position determined by the engagement of a collar 73, which is adjustably fixed on the lower end portion of the plunger 69, with the adjacent end wall of the casing 70, to position the roller 69a in the path of movement of each pipe. The plunger 69 is provided with laterally extending pins 74 which slide in slots 74a formed in the walls of the casing 70 to prevent rotation of the plunger. The lower ends of the plungers 69 are related axially to and operate the push-buttons or like elements 75 of a pair of normally open electric switches 76 when the push-buttons are moved downwardly, to close an electric circuit 76'. The switches 76 are held in operated position so long as the plungers 69 are held in depressed position by a pipe or pipe section on the supporting rollers 10, but are operated to circuit open position by their springs when the plungers 69 move upwardly.

Each switch 76 is mounted on the adjacent plate 71, so that when the latter is adjusted to position the roller 69a in operative relation to the adjacent supporting rollers 10, the relation of the switch 76 to the plunger 69 is not affected. As later set forth, the closing of the circuit 76' starts the cycle of operation of the mechanism. By preference, two plungers 69 and a switch 76 operatively related to each thereof are provided, so that the circuit 76' cannot be closed until both switches are operated, thereby requiring both ends of each pipe A to gravitate into cutting position before the circuit is closed.

Figure 14:
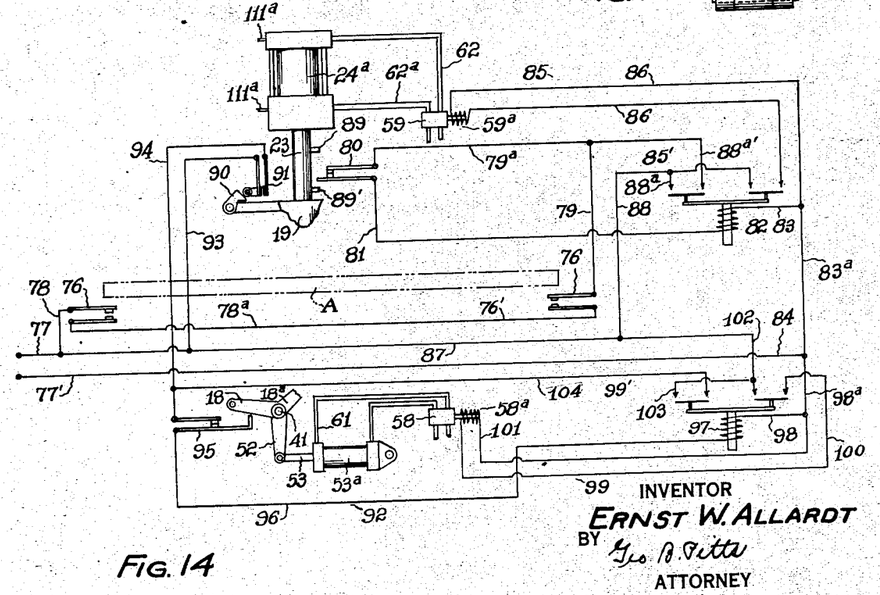
Fig. 14 is a diagrammatic view of the electrical wiring circuits.

The circuit 76' is traced as follows (see Fig. 14): from the current supply main 77, lead 78 to one contact of one switch 76, lead 78a from its other contact to one contact of the other switch 76, leads 79 and 79a from the other contact of the latter switch 76, to a normally closed switch 80 the movable member of which is disposed in the path of movement of the member 19 (see Figs. 1b and 4), lead 81 to coil of a relay 82, and leads 83, 83a, 84 to the other supply main 77'. The closing of the circuit 76' energizes the coil of relay 82, which closes a main circuit 85 and a secondary circuit 85'. The main circuit is traced as follows: from one contactor of relay 82, lead 86, in which the coil of the solenoid 59a is connected in series, leads 83a, 84 to the main 77'; from the main 77, leads 87, 88, to said contactor. The secondary circuit, which is provided to maintain the main circuit 85 closed in the event any movement or vibration of the pipe on the supports 7, 7a, permits the switches 76 or either thereof to open, is traced as follows: from the other contactor of relay 82, leads 88a, 88, 87 to main 77; from said contactor of relay 82, leads 88a', 79a, normally closed switch 80, lead 81, coil of relay 82 and leads 83, 83a, 84 to the main 77'.

The energizing of the coil of the solenoid 59a operates the valve 59 to provide flow of the fluid into and through pipe 62 to the cylinders 24a (only one cylinder being shown in Fig. 14), above the pistons therein, the effect of which is to move the member 19 downwardly to engage the cutters 8 with the pipe A and simultaneously cut it into sections a. As the member 19 reaches the limit of its downward movement a pin 89 thereon engages with and operates the movable contact of the switch 80 to open the circuit 76', thereby de-energizing the coil of relay 82, which in turn breaks the circuit 85' to de-energize the coil of the solenoid 59a. The valve 59 then operates to reverse the flow of the fluid through pipe 62 to pipe 62a leading to the cylinders 24a below the pistons therein, whereby the member 19 is moved upwardly. In the upward movement of the member 19, a spring controlled dog 90 pivoted thereon engages with and operates the movable member of a normally open switch 91 mounted on the wall 21 (see Figs. 3, 4 and 5) to momentarily close a circuit 92 which is traced as follows: lead 93 from one contact of switch 91 and lead 87 to the supply main 77; from the other contact of switch 91, lead 94 to one contact of a normally closed switch 95, lead 96 from the other contact of the switch 95, coil of relay 97 and leads 88, 88a, 84 to the supply main 77'. The closing of the circuit 92 energizes the coil of relay 97, which through its contactors closes a main circuit 99 and a secondary circuit 99' which maintains the coil of relay 97 energized following the opening of switch 91. The main circuit 99 is traced as follows: from one contactor of relay 97, lead 100, coil of solenoid 58a, lead 101, lead 98a and lead 84 to main 77'; from main 77, lead 87 and lead 102 to the said contactor. The secondary circuit 99' is traced as follows: from the other contactor of relay 97, lead 103, lead 102 and lead 87 to the main 77; from the main 77', lead 84, lead 98a, lead 98, coil of relay 97, lead 96, switch 95 and lead 94 and lead 104 to the said 58a contactor of relay 97. Upon closing of the circuits 99, 99' the coil of the solenoid is energized to operate the valve 58, which provides flow of fluid through the pipe 61 to the cylinder 53a on the outer side of the piston therein, the effect of which is to move the rod 53 toward the right (as viewed in Figs. 2 and 14), the rod serving to rock the shaft 41 and the latter in turn serving to operate the bell-cranks 18a, and links 47a, 49, whereby the ejector 45 and guard 15 are operated to the positions shown in Fig. 2a, and the stops 4 swing downwardly to release the leading pipe A, which gravitates into engagement with the ejector, as shown in Fig. 2a. As the bell-cranks 18a approach the limit of their movement, the arm 18 of one thereof engages with and operates the movable member of the switch 95 to break the circuit 99', the effect of which is to de-energize the coil of the relay 97 and coil of the solenoid 58a, thereby allowing the valve 58 to reverse the flow of fluid to the pipe 61a to the inner side of the piston in the cylinder 53a and move the rod 53 toward the left. This movement of the rod 53 restores the bell-cranks 18a and links 47a, 49, to their normal positions, and the latter move the guard 15 upwardly, the ejector 45 downwardly to its normal position and the stops 4 upwardly to engage the succeeding pipe A on the runway 3. The downward movement of the ejector permits the released pipe A to gravitate onto the supports 7, 7a, thereby operating the devices 7' to start the succeeding cycle of operations as above set forth.

The limit switch 80 is preferably mounted on the top wall 1e, the operating member of the switch being disposed in the path of movement of the device 88 suitably fixed to the member 19 (see Figs. 1b and 2.)

The switch 95 is mounted on the front wall 1c and provided with an operating member 106 disposed in the path of movement of a striker 107 mounted on the bell-crank arm 18 (see Fig. 2). The striker 107 preferably consists of a bolt threaded through a lug on the arm 18, whereby it may be adjusted endwise for accurately operating the member 106.

Figures 3, 4, 5:
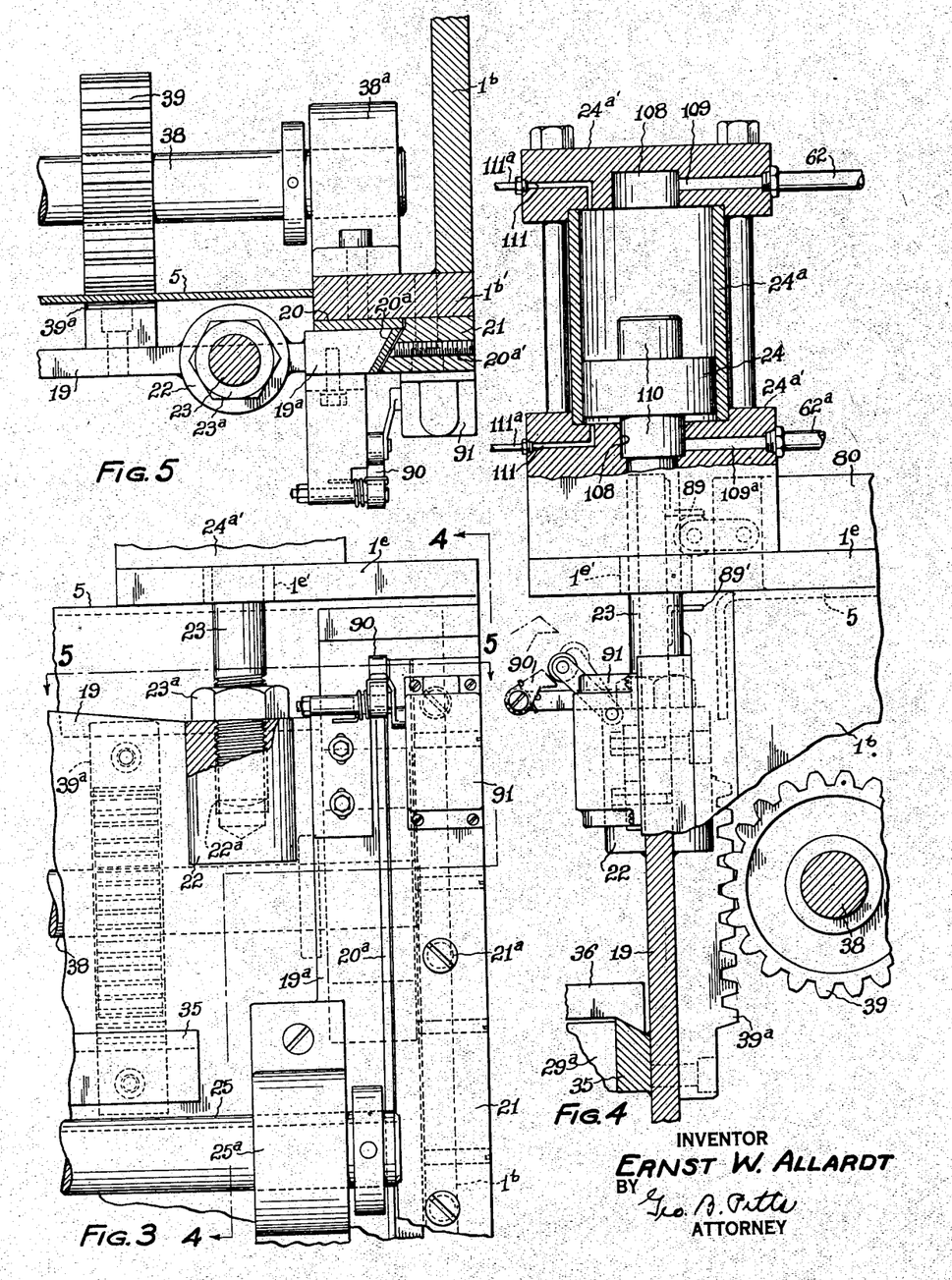
Fig. 3 is a fragmentary elevation of parts shown in Figs. 1 and 2 on the line 3—3 of the latter.
Figs. 4 and 5 are sections on the lines 4—4 and 5—5, respectively, of Fig. 3.

Provision is made for cushioning or retarding the movement of the member 19 as it approaches the limit of its movement in either direction, the purpose being, in the downward movement of the member 19, to permit the cutters to cut through the walls of each pipe without imparting excess pressure thereon and incidentally to avoid strains on the frame 1 which would otherwise occur. The means for cushioning or retarding the member 19 consist of a cut off for the fluid being discharged from the cylinders 24a as the pistons 24 therein approach corresponding ends of the cylinders in moving in either direction and a bypass through a relatively small discharge port at each end of the cylinders 24a connected to the adjacent supply and discharge pipe. As shown in Fig. 4, each head 24a' of the cylinder 24a is provided with a recess 108, the recess in the upper head being connected by a duct 109 with the pipe 62 and the recess in the lower head 24a' being connected by a duct 109a with the pipe 62a. Also, the piston 24 is provided on its opposite sides with projections 110 complementary to the recesses 108 and each arranged to project into the adjacent recess and serve as a valve to cut-off the flow of the fluid to the adjacent duct. Also, each head 24a' is provided with a relatively small duct 111 leading from the interior of the cylinder and connected by a pipe 111a with the adjacent supply and discharge pipe (see Fig. 1); that is, the pipes 111a leading from the upper heads 24a' of the cylinders 24a are connected to the supply and discharge pipe 62, preferably at the connection of the branches 62x thereto, whereas the pipes 111a leading from the lower heads 24a are connected to the supply and discharge pipe 62a, preferably at the connection of the branches 62a×thereto. The connection between the pipes 111a and the respective adjacent pipes 62, 62a, is provided with a valve 112 which may be operated to regulate the flow through the adjacent pipes 111a. The projections 110 are shown integrally connected to the adjacent piston 24 and the lower one suitably connected to the adjacent rod 23, but it will be apparent that the projections may be separately formed and removably connected to the piston so that projections of greater or lesser length may be substituted to regulate the cut-off of fluid discharge through the adjacent duct in relation to the limit of movement of the piston.

From the foregoing description it will be noted that the mechanism operates to successively sever pipes into sections automatically, so long as a supply of pipes A is maintained on the runway 3, the mechanism being started in the first instance by the simultaneous operation of the devices 7' to close the circuit 76'. The devices 7' may be operated to close the circuit by manually laying one of the pipes A on the supports 7, 7a. The closing of the circuit 76' through the solenoid 59a effects operation of the valve element 65 of valve 59 to supply the fluid to the cylinders 24a above the pistons 24 therein to move the member 19 downwardly, whereby the cutters 8 engage and cut the pipe into sections. At the end of the downward movement of the member 19, the striker 88 operates the switch 80 to break the circuit 76', whereby coil of solenoid 59a is de-energized to permit the valve element 65 of valve 59 to be moved by its spring to its other position to supply fluid to the cylinders 24a below the pistons therein, whereby the member 19 is elevated. In the upward movement of the member 19, the dog 90 operates the normally open switch 91 to momentarily close the circuit 92, which in turn closes the main circuit 99 and the secondary circuit 99'; the latter circuits through the solenoid 58a effecting operation of the valve 58, whereby fluid is supplied to the cylinder 53a outwardly of the piston therein to move it toward the right as viewed in Fig. 2. The piston operates through the arm 52, rock shaft 41 and bell cranks 18a to project the ejector 45 outwardly and stops 4 inwardly, whereby the pipe sections a are discharged from the supports 7, 7a, and the succeeding pipe A on the runway 3 is released to gravitate into engagement with the ejector. In this movement of the bell cranks 18a, one thereof operates the normally closed switch 95 to break the circuits 99, 99', whereby the coil of solenoid 58a is de-energized to permit the valve element of the valve 58 to be moved by its spring to its other position to supply fluid to the other side of the piston in the cylinder 53a and move the piston in the opposite direction, the latter movement serving to move the ejector inwardly and the stops 4 outwardly to engage the succeeding pipe A on the runway 3. Upon movement of the ejector inwardly, the previously released pipe A gravitates or rolls onto the supports 7, 7a, and operates the devices 7', whereby the cycle of operations is repeated.

Figs. 17 to 22, inclusive, show a modified form of construction, those parts thereof which are similar to corresponding parts shown in Figs. 1 to 13, 15 and 16 being indicated by the same reference characters, so that it will not be necessary to repeat the description thereof.

Figures 20, 21, 22:
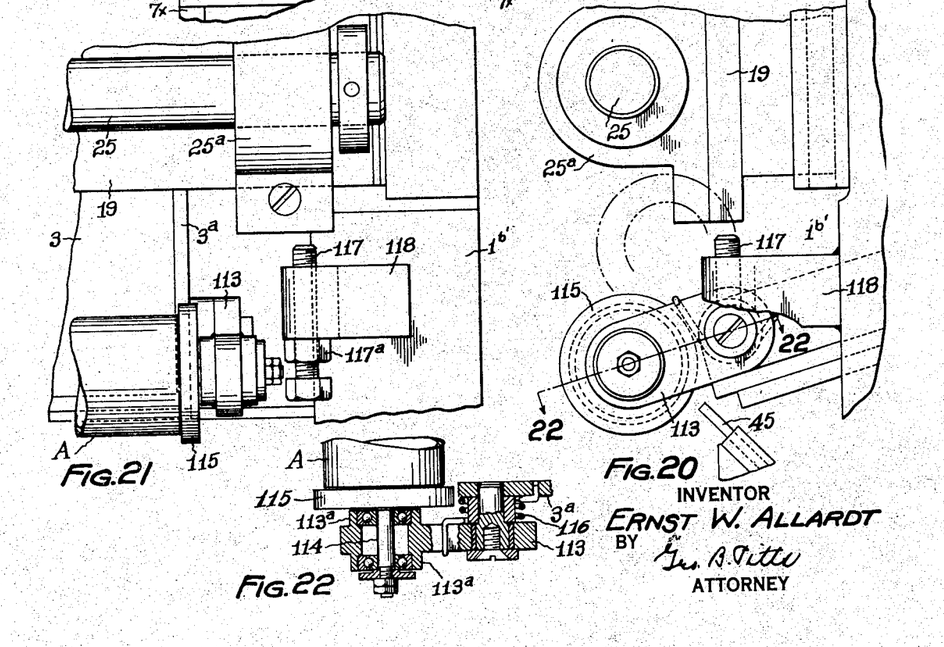
Fig. 20 is a fragmentary side elevation on the line 20—20 of Fig. 17, enlarged; being a side elevation of parts shown in Fig. 21.
Fig. 21 is a front elevation of the parts shown in Fig. 20.
Fig. 22 is a section on the line 22—22 of Fig. 20.

In the form of construction now being referred to, the side walls 3a of the runway 3, instead of being provided with a rigid extension disposed in alinement with the supports 7, 7a, each thereof has pivoted to it a link 113 carrying at its outer end hollow bosses 113a for suitable anti-friction bearings which support a shaft 114 (see Fig. 22). The links 113 are arranged to engage with the runway 3 which limits their movement downwardly to support the shafts 114 in axial alinement with each pipe A when positioned on the supports 7, 7a. Each shaft 114 is provided on its inner end with a disk 115. The inner face of the disk may be disposed in the plane of the inner face of the adjacent side wall 3a, but by preference it is disposed in a plane slightly outwardly of the inner face of the side wall (see Fig. 22) to avoid danger of the pipe end engaging therewith and becoming dislocated as it gravitates on to the supports 7, 7a. As the clearance between the pipe ends and the disks is very small, any endwise movement of the pipe in either direction, due to vibrations set up in the machine or operation of the cutters, will cause engagement of one end of the pipe with the adjacent disk 115, but as the later is free to rotate, the disk will rotate with the pipe and thus prevent damage to the pipe end or disk. As the disks 115 are disposed in the path of movement of the ejector 45, the latter when operated outwardly to discharge the pipe sections a, as already set forth, will kick the disks upwardly (see dotted lines in Fig. 20), but will allow them to swing back to operative position when it moves inwardly. By preference, I provide a coiled, relatively light spring 116 around the bushing between each link 113 and the adjacent side wall 3a and connect its ends to the link and side wall so that the spring may retard the upward movement of the link 113 and disk 115 thereon and quickly return them to operative position.

In this form of construction stops 117 are provided on the frame 1 in the path of movement of the opposite ends of the member 19 to limit its downward movement at a position predeterminately related to the thickness of the wall of each pipe A and to correlate the operation of the limit switch 80 to effect reversal of fluid flow to the cylinders 24a, the striker or lug 89 being arranged to operate the switch as the member 19 engages the stops 117. I prefer to provide two strikers or lugs 89 on the member 19 and two limit switches 80 on the frame 1 (see Fig. 17) each arranged to be operated by one of the strikers or lugs. The switches are connected in series in the circuit 85' so that both ends of the member 19 must engage the stops 117 to insure operation of both switches before the circuits 85, 85' are broken. This arrangement is preferable as it tends to speed up the movements of the member 19 in its reversal of movement following the operation of the cutters 8 and furthermore, since the member 19 is relatively long and ponderous and one end thereof will move faster or slower than its opposite end in the event any torsion occurs in the shaft 38 of the equalizing means, this arrangement prevents opening of the circuits 85, 85', until both ends of the member 19 engage the stops 117. Each stop 117 consists of a screw threaded into and through an opening formed in a bracket 118, which is welded or otherwise secured to the adjacent wall 1b', whereby the stop may be adjusted vertically. Each screw 117 is locked in adjusted position by a nut 117a.

119 indicates as an entirety hold-down means mounted on and movable with the member 19 and arranged to engage each pipe in advance of the cutters 8 and yieldingly hold it on the supports 7, 7a, during cutting thereof into sections. I preferably provide hold-down means 119 adjacent to each cutter, so that the stresses on the pipe by the cutting action of the cutters, or vibrations set up in the machine, will not displace the pipe sections while in a state of partial severance or following their complete severance, until the cutters 8 move upwardly and away from the pipe sections. This arrangement not only insures that the pipe sections will be of the desired length, but that their ends will be cut on a plane at right angles to their axes. As the several hold-down means 119 are similar in construction, the following description of one will serve for all, reference being made particularly to Figs. 18 and 19; 120 indicates a bracket consisting of an upright member 120a and an outwardly extending horizontal member 120b. The member 120a is provided with a shoulder 120a' forming with its rear wall a recess complementary to the guide 35a on the member 19, so that by means of a clamp 121 having flanges 121a, 121a', that engage the outer wall of the member 120a and guide 35, and secured in position by a nut 122 engaging a screw (not shown) extending upwardly from the member 120a, the bracket 120 is rigidly secured to the member 19. As will be apparent, the brackets 120 may be adjusted longitudinally of the guides 35, 35a, or removed therefrom. The horizontal member 120b of the bracket 120 is formed with two openings 123 the axes of which are parallel to but disposed upon opposite sides of a plane cutting the axis of each pipe A when the latter is in cutter engaging position on the supports 7, 7a. The openings 123 are preferably provided with suitable bushings which slidably support a pair of pins 124, connected together below the member 120b by a plate 125 to insure simultaneous movement of the pins in their bushings. The upper ends of the pins 124 are provided with heads 124a which engage the bracket member 120b to limit their downward movement for a reason later set forth. A spring 126 is mounted between the bracket member 120b and the plate 125 to normally slide the pins downwardly and maintain their heads 124a in engagement with the member 120b. The lower end of each pin 124 is bifurcated to support the opposite ends of a shaft 127 which is disposed parallel to each pipe when in cutter engaging position on the supports 7, 7a, and which supports a freely rotatable roller 128, the latter cooperating with the roller 128 on the lower end of the other pin 124 to engage each pipe A when the member 19 moves downwardly. When the pins 124 are in normal position, that is, with their heads 124a in engagement with the bracket member 120b, the lower peripheries of the rollers 128 are disposed in a plane below the peripheries of the cutters 8 (see Fig. 19), so as to engage the pipe A in advance of the cutters, but are free to move relative to the bracket 120 in opposition to the tension of the spring 126 (see Figs. 17 and 18) as the member 19 completes its downward movement to effect engagement of the cutters 8 with each pipe. As the rollers 128 are biased downwardly, they are yieldingly held in engagement with the pipe during the cutting operation and disengage the pipe sections after the cutters complete the severing operation and move upwardly out of engagement with the latter. The pins 124 are of such length that the bracket member 120b will engage the heads 124a to carry the pins and rollers 128 upwardly therewith in the upward movement of the member 19 so as to insure disengagement of the rollers from the pipe sections a in advance of the operation of the ejector 45. The heads 124a preferably comprise collars removably held on the upper ends of the pins 124 by bolts. By providing collars having annular portions of greater or lesser thickness, the normal position of the rollers 128 relative to the peripheries of the cutters 8 may be adjusted. This adjustment may also be provided by interposing annuli on the pins 124 between the bracket member 120b and the heads 124a.

Figures 17, 17A:
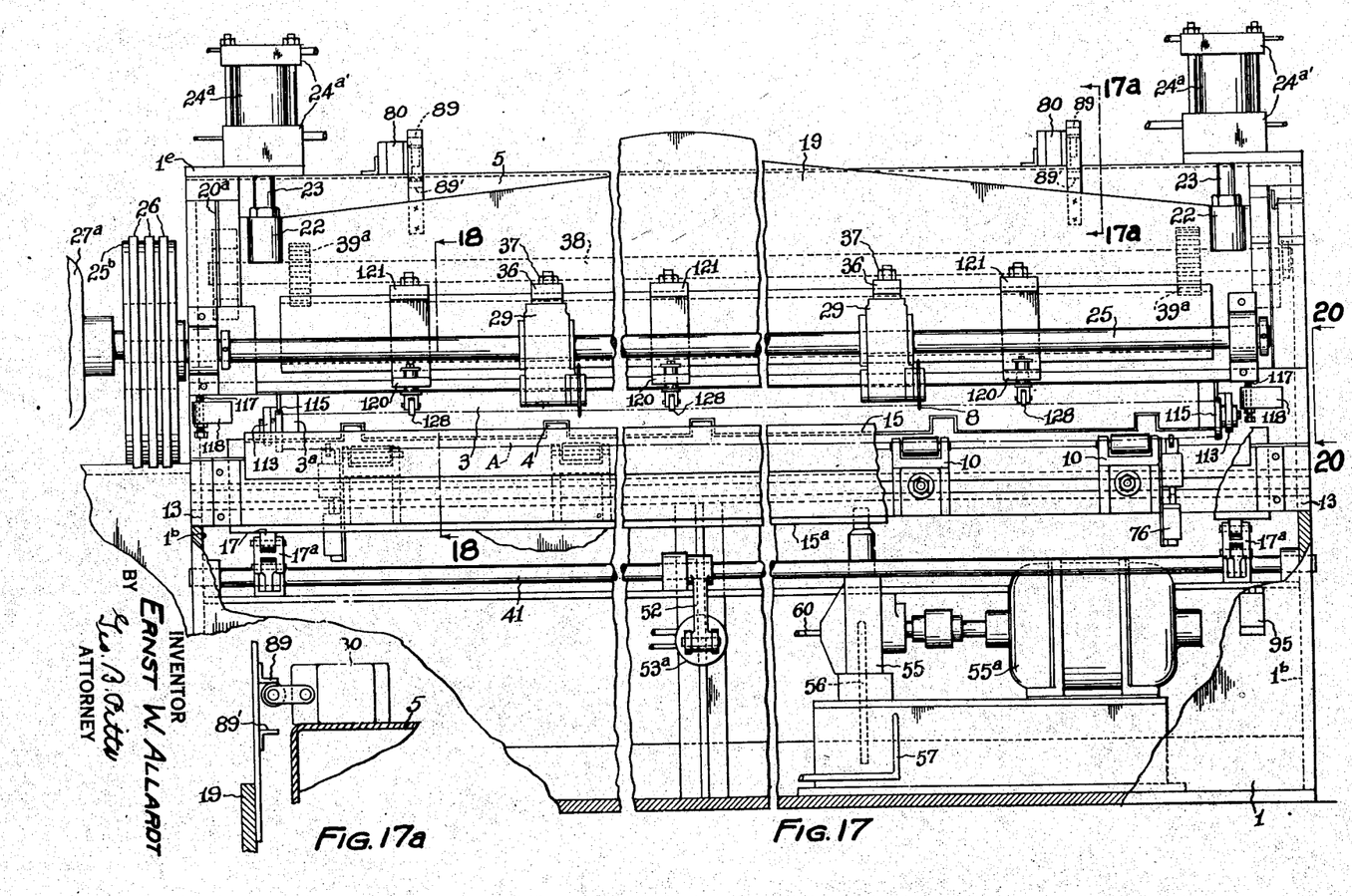
Fig. 17 is a front elevation embodying certain modifications, parts being broken away.
Fig. 17a is a fragmentary section on the line 17a—17a of Fig. 17.
Figures 18, 19:
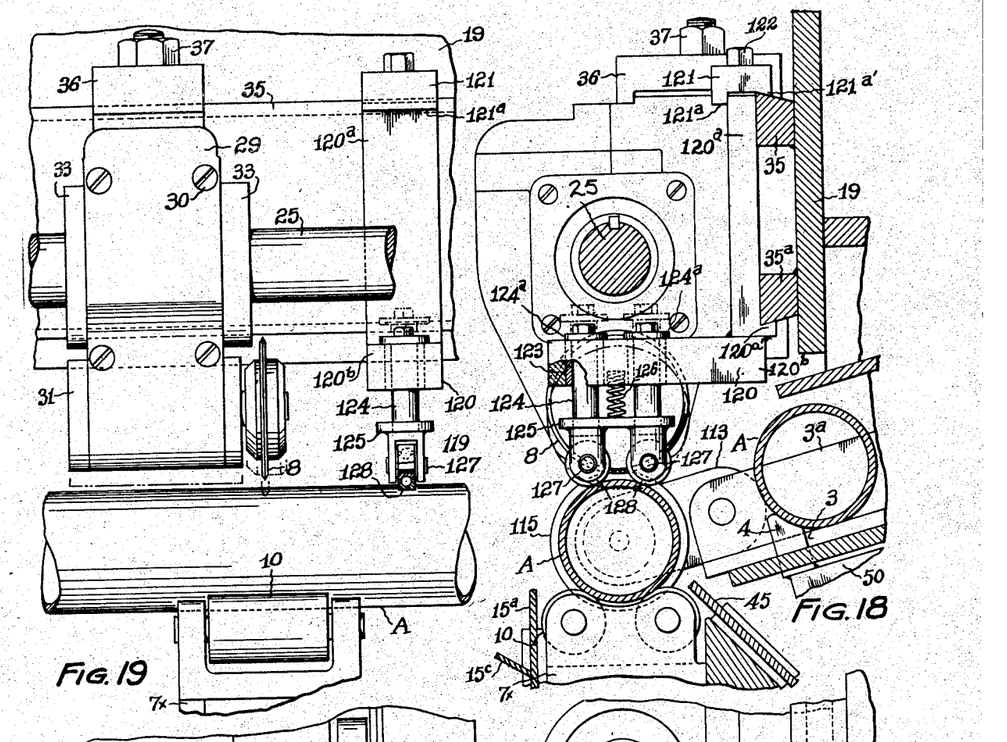
Fig. 18 is a fragmentary section on the line 18—18 of Fig. 17, enlarged.
Fig. 19 is a fragmentary elevation of parts shown in Fig. 17, enlarged; being a front view of parts shown in Fig. 18.

In the arrangement of the circuits, it is necessary for the switch 80 in Fig. 1 and corresponding switches in Fig. 17 to be closed when the member 19 starts to move downwardly and while these switches are of the normally closed type and automatically close following the operation thereof by the striker 89 I prefer to provide on the member 19 a separate striker 89' for each of these switches, which striker is arranged to engage with and operate the movable arm of the adjacent switch 80 in the upward movement of the member 19 in the event such arm is in switch open position due to vibrations in the machine or for other causes.

The pump 55 is preferably of any well known construction adapted to maintain a constant pressure in the fluid system.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a machine of the class described, the combination with a frame, of a support thereon for bodies, a separate support on which the bodies rest for delivery to said first mentioned support, a member reciprocatably mounted on said frame, a cutter mounted on said member in position to sever each body intermediate its ends upon movement of said member in one direction, means for reciprocating said member, a movable stop arranged to successively release the bodies for delivery thereof to said first mentioned support, and means controlled by the delivery of each body to said first mentioned support for controlling the operation of said reciprocating means.

2. A machine as claimed in claim 1 wherein means are provided for discharging the pipe sections from said first mentioned support.

3. In a machine of the class described, the combination with a frame, of a support for bodies, a separate support on which the bodies rest for delivery to said first mentioned support, a member reciprocatably mounted in said frame, a cutter mounted on said member in position to sever each body intermediate its ends upon movement of said member in one direction, means for reciprocating said member, an equalizing mechanism for the opposite end portions of said member and between it and said frame, a movable stop arranged to successively release the bodies for delivery thereof to said first mentioned support, and means controlled by the delivery of each body to said first mentioned support for controlling the operation of said reciprocating means.

4. In a machine of the class described, the combination with a frame, of a support for bodies, a separate support on which the bodies rest for delivery to said first mentioned support, a movable guard in front of said first mentioned support, a member reciprocatably mounted on said frame, a cutter mounted on said reciprocatable member in position to sever each body intermediate its ends upon movement of said member in one direction, means for reciprocating said member, a movable stop arranged to successively release the bodies for delivery thereof to said first mentioned support, means controlled by the delivery of each body to said first mentioned support for controlling the operation of said reciprocating means, and means for simultaneously operating said stop to release a body from said separate support and said guard to permit the discharge of the body sections from said first mentioned support.

5. A machine as claimed in claim 4, wherein means actuated by said reciprocatable member are provided for controlling said last mentioned operating means.

6. In a machine of the class described, the combination with a frame, of a support for bodies, a separate support on which the bodies rest for delivery to said first mentioned support, a member reciprocatably mounted on said member in position to sever each body intermediate its ends upon movement of said member in one direction, means for reciprocating said member, means controlled by the delivery of each body to said first mentioned support for controlling the operation of said reciprocating means, and means for simultaneously discharging the body sections from said first mentioned support and delivering a body from said separate support to said first mentioned support.

7. A machine as claimed in claim 6 wherein are provided means actuated by said member for controlling the operation of said discharging and delivery means.

8. A machine as claimed in claim 1 wherein the controlling means includes separate operating elements disposed in position to be engaged by the opposite end portions of each body.

9. In a machine of the class described, the combination with a frame, of a support for hollow bodies to be severed into sections, a separate support on which the bodies rest for delivery to said first mentioned support, a member reciprocatably mounted on said frame, a cutter mounted on said member in position to sever each body intermediate its ends upon movement of said member in one direction, means for reciprocating said member, means controlled by the delivery of each body to said first mentioned support for controlling said reciprocating means, a movable stop for the bodies arranged to successively release them from said separate support, a device for discharging the severed sections from said first mentioned support, and means for simultaneously operating said stop and said device in co-ordinated relation to discharge the severed sections in advance of the delivery of a body to said separate support.

10. In a machine of the class described, the combination with a frame, of a support comprising spaced rollers mounted thereon for pipes, a separate support on which the pipes rest for successive delivery to said first mentioned support, a member reciprocatably mounted on said frame, a rotatable cutter mounted on said member in position to sever each pipe intermediate its ends upon movement of said member in one direction, means for reciprocating said member, means for rotating said cutter, a movable stop arranged to successively release the pipes for delivery thereof to said first mentioned support, and means controlled by the delivery of each pipe to said first mentioned support for controlling the operation of said reciprocating means.

11. In a machine of the class described, the combination with a frame, of a support for hollow bodies, a separate support on which the bodies rest for delivery to said first mentioned support, a member reciprocatably mounted on said frame, a cutter mounted on said member in position to sever each body intermediate its ends upon movement of said member in one direction, hydraulic means for reciprocating said member, means arranged to successively release the bodies from said separate support for delivery thereof to said first mentioned support, means actuated by the delivery of a body to said first mentioned support for controlling said hydraulic means to move said member in one direction, and means actuated by said member for controlling said hydraulic means to move said member in the opposite direction.

12. A machine as claimed in claim 11 wherein are provided hydraulic means for operating said release means, said hydraulic means being controlled by the reciprocatable member to effect movement of the release means in one direction.

13. In a machine of the class described, the combination with a frame, of a support thereon for bodies, a separate support on which the bodies rest for delivery to said first mentioned support, a member reciprocatably mounted on said frame, a cutter mounted on said member in position to sever each body intermediate its ends upon movement of said member in one direction, a movable stop arranged to successively release the bodies for delivery thereof to said first mentioned support, means for discharging the severed sections from the first mentioned support, means, including a source of power, for operating said reciprocating member, said discharge means and said stop in co-ordinated relation, and a device arranged to be actuated by each body during its delivery to said first mentioned support for controlling the operation of said operating means.

14. In a machine of the class described, the combination with a frame, of a support for bodies, a separate support on which the bodies rest for delivery to said first mentioned support, a member reciprocatably mounted on said frame, a cutter mounted on said member in position to sever each body intermediate its ends upon movement of said member in one direction, a movable stop arranged to successively release the bodies from said separate support for delivery thereof to said first mentioned support, an ejector for discharging the severed sections from said first mentioned support, means, including a source of power, for operating said member, said ejector and said stop in co-ordinated relation away from and back to their respective normal positions, and a device arranged to be actuated by each body during its delivery to said first mentioned support for controlling the operation of said operating means.

15. In a machine of the class described, the combination with a frame, of a support for hollow bodies, a separate support on which the bodies rest for delivery to said first mentioned support, a member reciprocatably mounted on said frame, a cutter mounted on said member in position to sever each body intermediate its ends upon movement of said member in one direction, means for reciprocating said member, a movable stop arranged to successively release the bodies from said separate support for delivery thereof to said first mentioned support, an ejector for discharging the severed sections from said first mentioned support, hydraulically operated means for simultaneously actuating said stop and ejector, means actuated by said reciprocatable member in moving in one direction for controlling the operation of said hydraulically operated means to move said stop and ejector in one direction, and means actuated by said hydraulically operated means for moving the stop and ejector in the opposite direction.

16. In a machine of the class described, the combination with a frame, of a support for hollow bodies, a separate support on which the bodies rest for delivery to said first mentioned support, a member reciprocatably mounted in said frame, a cutter mounted on said member in position to sever each body intermediate its ends upon movement of said member in one direction, means for reciprocating said member, mechanism for simultaneously discharging the severed sections from said first mentioned support and releasing a body from said separate support, and hydraulic means for operating said mechanism.

17. A machine as claimed in claim 16 wherein means actuated by said reciprocatable member are provided for controlling said hydraulic means to operate said mechanism in one direction, and means actuated by said mechanism are provided to control said hydraulic means to operate said mechanism in the opposite direction.

18. In a machine of the class described, the combination with a frame, of a runway for pipes to be severed into sections, a support for each pipe operatively related to the delivery end of said runway, a member reciprocatably mounted on said frame, a cutter on said member, for cutting each pipe into sections, devices for discharging the sections from said support and releasing a pipe from said runway, power means for reciprocating said member and operating said devices, means including an element disposed in the path of movement of each pipe from said runway thereto, for effecting operation of said power means to move said member toward the pipe and an element disposed in the path of movement of said member for effecting operation of said power means to move said member in the opposite direction, and means for controlling the movement of said devices by said power means in co-ordinated relation to the movement of said member.

19. In a machine of the class described, the combination with a frame, of a support for a plurality of pipes, a holder for each pipe, a movable member having a cutter arranged to engage a pipe when positioned on said holder, to cut it into sections, a device for ejecting the sections from said holder, a device for releasing a pipe from said support, and means for automatically operating said member and devices in co-ordinated relation, said means being controlled by each pipe during its movement to said holder.

20. A machine as claimed in claim 19 wherein are provided electrical means for controlling said operating means, said electrical means including a circuit and switches arranged to be operated by the opposite end portions of each pipe to close said circuit as the pipe moves from said support to said holder.

21. In a machine of the class described, the combination with a frame, of a support for pipes to be severed into sections, a reciprocatable member, a cutter on said member for severing each pipe into sections upon movement of said member in one direction, means for reciprocating said member, a runway having a delivery end related to said support, for holding a supply of pipes, a movable stop device for the forwardmost pipe on said runway and arranged when operated to release the forwardmost pipe for gravitation to said support, an ejector device for the severed pipe sections connected to said stop device for co-ordinated operation therewith, whereby the forwardmost pipe is released from said runway simultaneously with the discharge of the pipe sections from said support, and means connected with one of said devices for operating the latter.

22. In a machine of the class described, the combination with a frame, of a support for pipes to be severed into sections, a reciprocatable member, a cutter on said member for severing each pipe into sections upon movement of said member in one direction, means for reciprocating said member, a runway having a delivery end related to said support, for holding a supply of pipes, a movable stop device for the forward-most pipe on said runway and arranged when operated in one direction to release the forward-most pipe whereby the pipes gravitate on said runway, an ejector device arranged when operated in one direction to discharge the severed pipe sections from said support, said ejector device being connected to said stop device for co-ordinated operation therewith, whereby the forward-most-pipe is released from said runway simultaneously with the discharge of the pipe sections from said support, said ejector, when in operated position being spaced from said stop device a distance substantially equal to the diameter of each pipe and arranged to arrest the gravitation of the pipes on said runway, whereby upon operation of said stop device and ejector device in the opposite direction the forward-most pipe gravitates onto said support and the succeeding pipe is engaged by said stop device, and means connected with one of said devices for operating the latter.

23. In a machine of the class described, the combination with a frame, of a support for pipes to be severed into sections, a reciprocatable member, a cutter on said member for severing each pipe into sections upon movement of said member in one direction, means for reciprocating said member, a runway having a delivery end related to said support, for holding a supply of pipes, a pair of connected devices related to the delivery end of said runway and said support for simultaneous movement in opposite directions and arranged when operated to successively discharge the pipes for gravitation to said support, one of said devices being arranged when operated to discharge the severed pipe sections from said support, and means connected with one of said devices for operating the latter.

24. In a machine of the class described, the combination with a frame, of a pair of rollers for supporting pipes to be severed into sections, a reciprocating member, a rotatable cutter on said member for severing each pipe into sections upon movement of said member in one direction, means for reciprocating said member, means for rotating said cutter, a runway for holding a supply of pipes, means for successively discharging the pipes from said runway for gravitation to said rollers, and devices mounted on said frame and each provided with a disk rotatable on an axis coincident with the axis of each pipe when supported on said rollers, said disks being spaced to form abutments for the opposite ends of each pipe.

25. In a machine of the class described, the combination with a frame, of a support for pipes to be severed into sections, a reciprocatable member, a cutter mounted on said member for severing each pipe into sections upon movement of said member in one direction, means for reciprocating said member, a separate support for holding a supply of pipes, means for successively releasing pipes from said separate support for delivery to said first mentioned support, and hold-down means on said member, including a yieldingly mounted device arranged to engage each pipe when positioned on said first mentioned support in advance of said cutter and yieldingly hold the pipe thereon during the engagement of the cutter therewith.

26. In a machine of the class described, the combination with a frame, of a pair of rollers for supporting pipes to be severed into sections, a reciprocating member, a rotatable cutter on said member for severing each pipe into sections upon movement of said member in one direction, means for reciprocating said member, means for rotating said cutter, a runway for holding a supply of pipes, means for successively discharging the pipes from said runway for gravitation to said rollers, and hold-down means comprising a pair of connected together pins slidably mounted on said member, and provided with spaced rollers arranged to engage each pipe when positioned on said supporting rollers in advance of said cutter and a spring normally tending to move said rollers into pipe engagement position, whereby each pipe is yieldingly held on its supporting rollers during cutting of the pipe into sections.

27. In a machine of the class described, the combination with a frame, of a support thereon for pipes to be severed into sections, a reciprocatable member, a cutter mounted on said member for severing each pipe into sections upon movement of said member in one direction, power means for reciprocating said member, means for controlling said power means, said controlling means including an electrical circuit and a pair of switches on said frame series connected in said circuit, a separate support on said frame for holding a supply of pipes, means for successively releasing pipes from said separate support for delivery to said first mentioned support, stops on said frame in position to be engaged by the opposite ends of said member to limit the downward movement thereof, and a striker carried by each end portion of said member and arranged to operate one of said switches substantially at the time the corresponding end of said member engages the adjacent stop.

ERNST W. ALLARDT.